(12) United States Patent
Sawabe et al.

(10) Patent No.: US 7,580,136 B2
(45) Date of Patent: Aug. 25, 2009

(54) HEIGHT POSITION DETECTOR FOR WORK HELD ON CHUCK TABLE

(75) Inventors: Taiki Sawabe, Ota-Ku (JP); Keiji Nomaru, Ota-ku (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 12/189,910

(22) Filed: Aug. 12, 2008

(65) Prior Publication Data
US 2009/0064521 A1 Mar. 12, 2009

(30) Foreign Application Priority Data
Sep. 6, 2007 (JP) ............................. 2007-231907

(51) Int. Cl.
*G01B 11/24* (2006.01)
(52) U.S. Cl. ..................................... 356/614
(58) Field of Classification Search .......... 356/614–624
See application file for complete search history.

(56) References Cited

U.S. PATENT DOCUMENTS

| | | | | |
|---|---|---|---|---|
| 6,774,995 | B2 * | 8/2004 | Quist et al. | ........... 356/338 |
| 7,428,062 | B2 * | 9/2008 | Nomaru | ........... 356/614 |
| 7,459,655 | B2 * | 12/2008 | Nomaru | ........... 219/121.78 |
| 2005/0224475 | A1 * | 10/2005 | Nomaru | ........... 219/121.82 |
| 2005/0236381 | A1 * | 10/2005 | Nomaru | ........... 219/121.74 |

FOREIGN PATENT DOCUMENTS

| | | |
|---|---|---|
| JP | B2 3408805 | 7/2002 |
| JP | A 2007-152355 | 6/2007 |

* cited by examiner

*Primary Examiner*—Michael P Stafira
(74) *Attorney, Agent, or Firm*—Greer, Burns & Crain, Ltd.

(57) ABSTRACT

A height position detector for detecting the height position of an upper surface of a work held on a chuck table, including: an annular spot forming part by which the spot shape of a laser beam oscillated by a laser beam oscillator is formed into an annular shape; a first beam splitter by which the laser beam with the spot shape formed into the annular shape is guided into a first path; a light condenser by which the laser beam guided into the first path is condensed to irradiate the work therewith; a second beam splitter for splitting the reflected light reflected by the work; a first light receiving element for receiving the reflected light transmitted through the second beam splitter; a second light receiving element for receiving the reflected light reflected by the second beam splitter; a light reception region restricting part for restricting the light reception region for the reflected light received by the second light receiving element; and a controller for determining the height position of the upper surface of the work on the basis of the ratio between the quantity of light received by the first light receiving element and the quantity of light received by the second light receiving element.

2 Claims, 13 Drawing Sheets

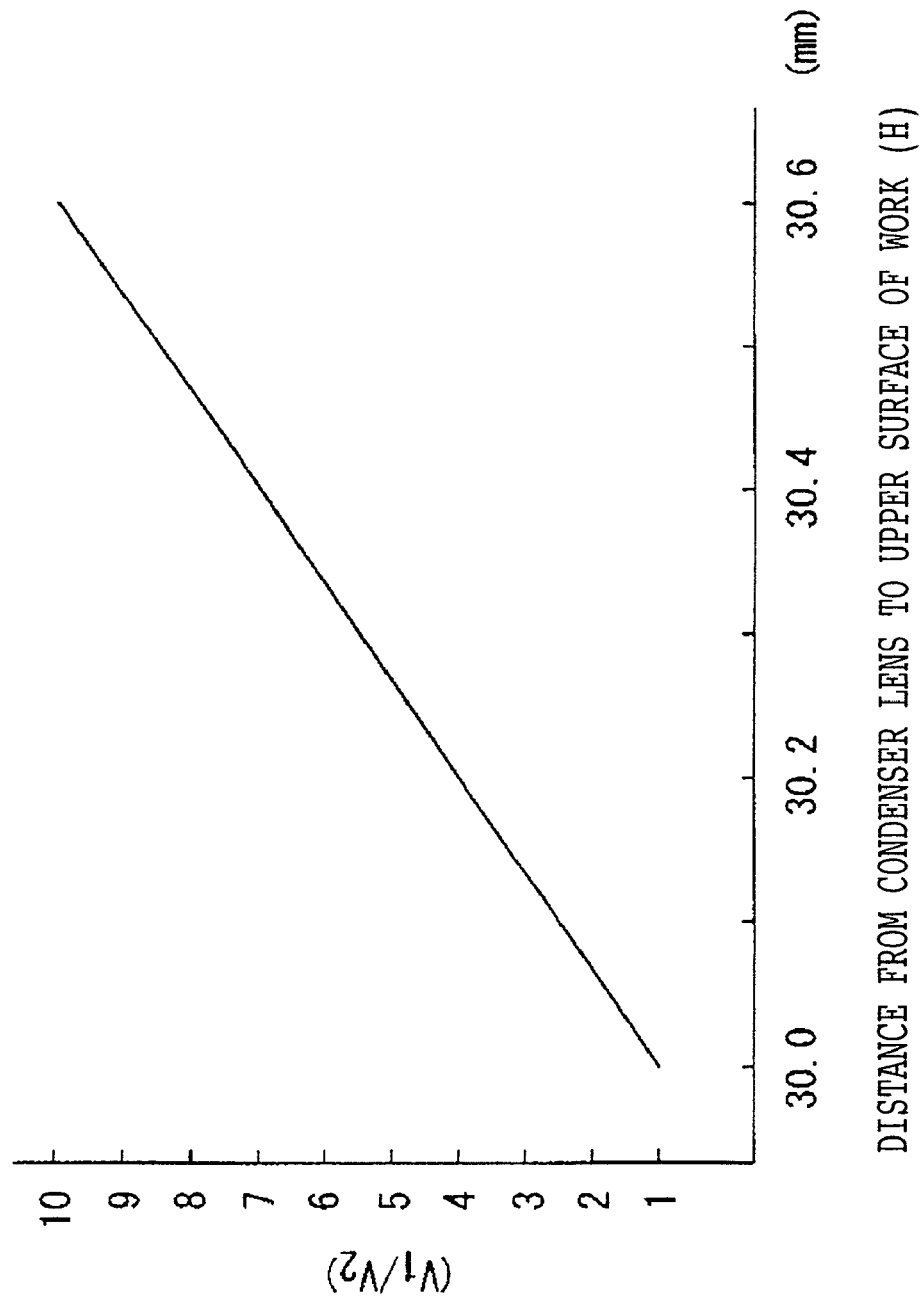

HEIGHT POSITION DETECTOR FOR WORK HELD ON CHUCK TABLE

BACKGROUND OF THE INVENTION

1. Field of the Invention

The present invention relates to a height position detector for detecting the height position of an upper surface of a work, such as a semiconductor wafer, held on a chuck table provided in a machining apparatus such as a laser beam machining apparatus.

2. Description of the Related Art

In a semiconductor device manufacturing process, a surface of a semiconductor wafer in a roughly circular disk-like shape is provided with a plurality of regions demarcated by planned dividing lines called streets arranged in a grid pattern, and devices such as ICs and LSIs are formed in the thus demarcated regions. Then, the semiconductor wafer is cut along the streets, whereby the regions with the devices formed therein are divided from each other, to manufacture the individual devices. Similarly, an optical device wafer in which a gallium nitride compound semiconductor and the like are stackedly formed on a surface of a sapphire substrate is cut along planned dividing lines into individual optical devices such as light emitting diodes and laser diodes, which are widely utilized for electric apparatuses.

As a method for dividing the semiconductor wafer, the optical device wafer or the like along the streets formed therein, a laser beam machining method has been attempted in which irradiation of the wafer with a pulsed laser beam is conducted by using a pulsed laser beam transmissive to the wafer and by positioning a light condensing point in the inside of the regions to be divided. In the dividing method using the laser beam machining method, a wafer is irradiated from one side thereof with a pulsed laser beam transmissive to the wafer which has a wavelength of, for example, 1064 nm while positioning the light condensing point in the inside of the wafer, so as to continuously form a denatured layer in the inside of the wafer along the streets, and the work is divided by exerting an external force along the planned dividing lines lowered in strength by the formation of the denatured layer (refer to, for example, Japanese Patent No. 3408805).

However, where the plate-like work such as a semiconductor wafer has undulation and has a dispersion of its thickness, the denatured layer cannot be formed uniformly at a predetermined depth through the irradiation with a laser beam, due to a factor associated with the refractive index of the work. Therefore, in order to form the denatured layer uniformly at a predetermined depth in the inside of the semiconductor wafer or the like, it is necessary to preliminarily detect the projection-and-recess form of the region to be irradiated with the laser beam, and to cause laser beam irradiation means to track the projection-and-recess form at the time of machining.

In order to solve the above-mentioned problem, the present applicant has proposed a laser beam machining apparatus having height position detecting means by which a face-side surface (upper surface) of a work held on a chuck table is irradiated with a visible laser beam, and, based on the quantity of light corresponding to the area of reflection by the face-side surface (upper surface) of the work, the height position of the face-side surface (upper surface) of the work is detected (refer to, for example, Japanese Patent Laid-open No. 2007-152355).

In the height position detecting means disclosed in the just-mentioned laid-open patent publication, in the case where the wafer as the work is formed of silicon, the visible laser beam is not transmitted through the work and, therefore, the quantity of light corresponding to the area of reflection by the face-side surface (upper surface) of the work can be measured accurately. However, in the case where the wafer is formed of sapphire or quartz having transparency to the laser beam, the laser beam is not only reflected by the face-side surface (upper surface) of the work but also reflected by the back-side surface (lower surface) of the work, so that it is impossible to measure only the quantity of the light reflected by the face-side surface (upper surface) of the work. Therefore, it is impossible, by the height position detecting means disclosed in the laid-open patent publication, to detect the height position of a work formed from a material having a transparent property.

SUMMARY OF THE INVENTION

Accordingly, it is an object of the present invention to provide a height position detector for securely detecting the height position of an upper surface of a work held by a chuck table even in the case where the work is formed from a material having a transparent property.

In accordance with an aspect of the present invention, there is provided a height position detector for a work held on a chuck table, for detecting the height position of an upper surface of a work held on a chuck table, including: laser beam oscillating means for oscillating a laser beam; annular spot forming means by which a spot of the laser beam oscillated by the laser beam oscillating means is formed into an annular shape; a first beam splitter by which the laser beam with the spot formed into the annular shape by the annular spot forming means is guided into a first path; a light condenser by which the laser beam guided into the first path is condensed so as to irradiate the work held on the chuck table therewith; a pinhole mask disposed in a second path into which reflected light reflected by the work held on the chuck table is split by the first beam splitter; a second beam splitter by which the reflected light having passed through the pinhole mask is split into a third path and a fourth path; a first light receiving element for receiving the reflected light split into the third path by the second beam splitter; a second light receiving element for receiving the reflected light split into the fourth path by the second beam splitter; light reception region restricting means which is disposed in the fourth path and which restricts a reflected light reception region where the reflected light is received by the second light receiving element; and control means by which the height position of the upper surface of the work held on the chuck table is determined based on the ratio between the quantity of light received by the first light receiving element and the quantity of light received by the second light receiving element.

The annular spot forming means includes a pair of conical lenses arranged in series at a predetermined interval along the laser beam.

The height position detector for a work held on a chuck table according to the present invention is configured as above, the laser beam with a circular spot shape oscillated from the laser beam oscillating means is formed into a laser beam with an annular spot shape by the annular spot forming means, and the work is irradiated with the laser beam having the annular spot shape. Therefore, the laser beam having the annular spot shape with which the work is irradiated is reflected by the upper surface of the work while having the annular spot shape and, in the case where the work has a transparent property, the laser beam is reflected also by the lower surface of the work while having an annular spot shape. Then, the second reflected light with the annular spot shape which has been reflected by the lower surface of the work is intercepted by the pinhole mask, and the quantity of received light is detected based on the first reflected light with the annular spot shape which has been reflected by the upper surface of the work and passed through the pinhole in the pinhole mask, so that the position of the upper surface of the work can be accurately detected even in the case where the work has a transparent property.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 7 is a control map showing the relation between the ratio of a voltage (V1) outputted from a first light receiving element constituting the height position detector shown in FIG. 2 to a voltage (V2) outputted from a second light receiving element constituting the detector, and the distance from a light condenser to the upper surface of the work;

DETAILED DESCRIPTION OF THE PREFERRED EMBODIMENTS

Figure 1:
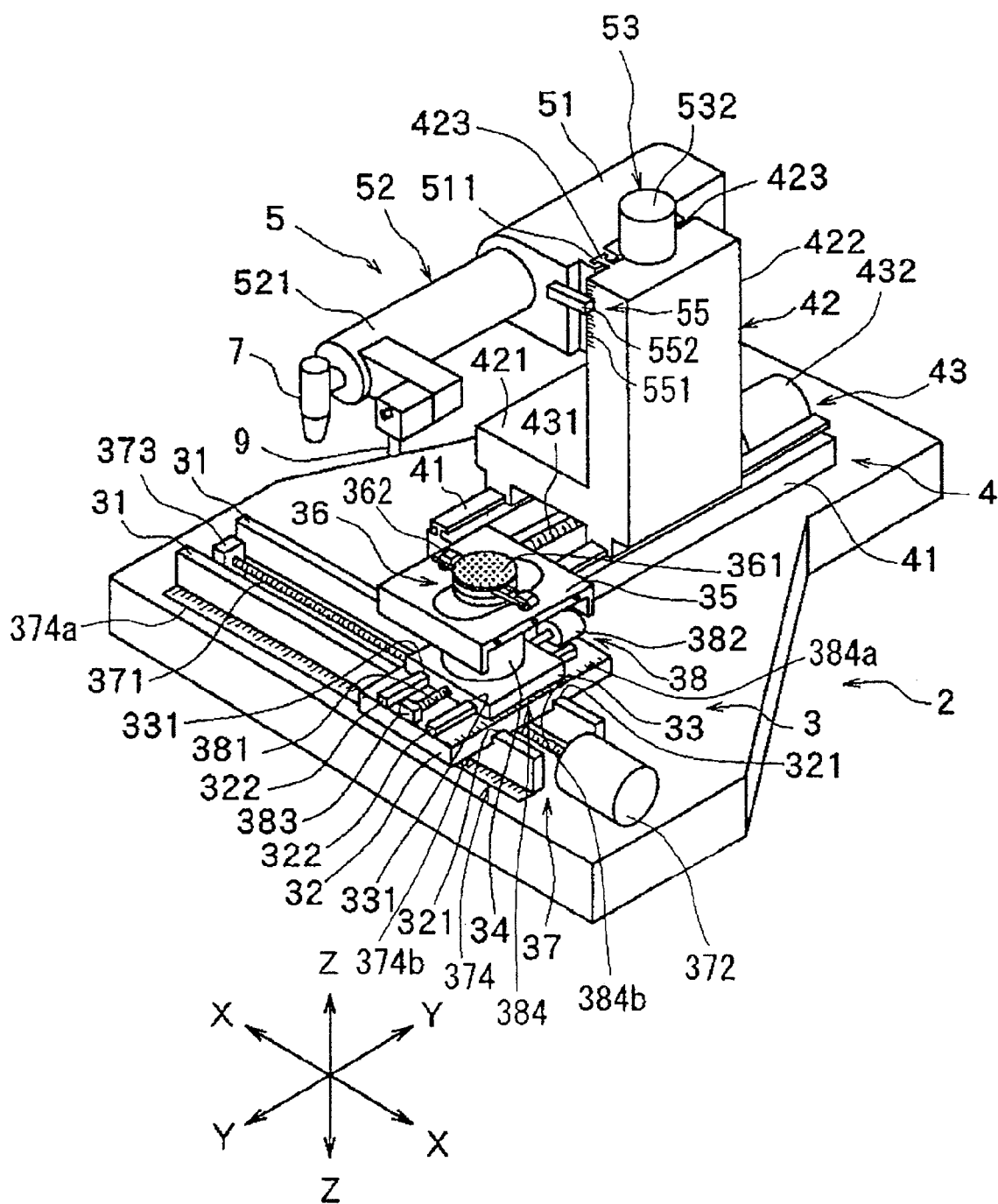
FIG. 1 is a perspective view of a laser beam machining apparatus equipped with a height position detector for a work held on a chuck table which is configured according to the present invention.

Now, a preferred embodiment of a height position detector for a work held on a chuck table which is configured according to the present invention will be described more in detail below, referring to the attached drawings. FIG. 1 shows a perspective view of a laser beam machining apparatus as a machining apparatus equipped with a height position detector for a work held on a chuck table which is configured according to the present invention. The laser beam machining apparatus shown in FIG. 1 includes: a stationary base 2; a chuck table mechanism 3 for holding a work which is disposed on the stationary base 2 so as to be movable in a machining feed direction indicated by arrow X; a laser beam irradiation unit support mechanism 4 disposed on the stationary base 2 so as to be movable in an indexing feed direction (Y-axis direction) indicated by arrow Y which is orthogonal to the direction (X-axis direction) indicated by arrow X; and a laser beam irradiation unit 5 disposed on the laser beam unit support mechanism 4 so as to be movable in a direction (Z-axis direction) indicated by arrow Z.

The chuck table mechanism 3 include: a pair of guide rails 31, 31 disposed on the stationary base 2 in parallel to each other along the machining feed direction indicated by arrow X; a first slide block 32 disposed on the guide rails 31, 31 so as to be movable in the machining direction (X-axis direction) indicated by arrow X; a second slide block 33 disposed on the first slide block 32 so as to be movable in the indexing feed direction (Y-axis direction) indicated by arrow Y; a cover table 35 supported on the second slide block 33 by a hollow cylindrical member 34; and a chuck table 36 as work holding means. The chuck table 36 has a suction chuck 361 formed from a porous material, and a work, for example, a circular disk-like semiconductor wafer is held on the suction chuck 361 by suction means (not shown). The chuck table 36 thus configured is rotated by a pulse motor (not shown) disposed in the hollow cylindrical member 34. Incidentally, the chuck table 36 is equipped with clamps 362 for fixing an annular frame which will be described later.

The first slide block 32 is provided in its lower surface with a pair of guided grooves 321, 321 in which to fit the pair of guide rails 31, 31, and is provided on its upper surface with a pair of guide rails 322, 322 formed in parallel to each other along the indexing feed direction indicated by arrow Y. The first slide block 32 thus configured is movable in the machining feed direction indicated by arrow X along the pair of guide rails 31, 31, with its guided grooves 321, 321 fitted over the pair of guide rails 31, 31. The chuck table mechanism 3 in the embodiment shown in the figure is equipped with machining feeding means 37 by which the first slide block 32 is moved in the machining feed direction indicated by arrow X along the pair of guide rails 31, 31.

The machining feeding means 37 includes a male screw rod 371 disposed in parallel to and between the pair of guide rails 31 and 31, and a drive source such as a pulse motor 372 for driving the male screw rod 371 to rotate. Of the male screw rod 371, one end is rotatably supported on a bearing block 373 fixed to the stationary base 2, and the other end is power-transmittingly connected to an output shaft of the pulse motor 372. Incidentally, the male screw rod 371 is in screw engagement with a penetrating female screw hole formed in a female screw block (not shown) projectingly provided at a lower surface of a central part of the first slide block 32. Therefore, with the male screw rod 371 driven by the pulse motor 372 to rotate normally and reversely, the first slide block 32 is moved in the machining feed direction (X-axis direction) indicated by arrow X along the guide rails 31, 31.

The laser beam machining apparatus in the embodiment shown in the figure is provided with X-axis direction position detecting means 374 for detecting the position in the X-axis direction of the chuck table 36. The X-axis direction position detecting means 374 includes a linear scale 374a disposed along the guide rail 31, and a reading head 374b disposed on the first slide block 32 and moved along the linear scale 374a together with the first slide block 32. The reading head 374b of the X-axis direction position detecting means 374, in the embodiment shown in the figure, sends a pulse signal containing one pulse per 1 µm to control means which will be described later. The control means described later counts the pulses in the pulse signal inputted thereto, thereby detecting the position in the X-axis direction of the chuck table 36.

The second slide block 33 is provided in its lower surface with a pair of guided grooves 331, 331 in which to fit the pair of guide rails 322, 322 provided on the upper surface of the first slide block 32, and is movable in the indexing feed direction (Y-axis direction) indicated by arrow Y, with its guided grooves 331, 331 fitted over the pair of guide rails 322, 322. The chuck table mechanism 3 in the embodiment shown in the figure is provided with first indexing feeding means 38 for moving the second slide block 33 in the indexing feed direction (Y-axis direction) indicated by arrow Y along the pair of guide rails 322, 322 provided on the first slide block 32. The first indexing feeding means 38 includes a male screw rod 381 disposed in parallel to and between the pair of guide rails 322 and 322, and a drive source such as a pulse motor 382 for driving the male screw rod 381 to rotate.

Of the male screw rod 381, one end is rotatably supported on a bearing block 383 fixed to the upper surface of the first slide block 32, and the other end is power-transmittingly connected to an output shaft of the pulse motor 382. Incidentally, the male screw rod 381 is in screw engagement with a penetrating female screw hole formed in a female screw block (not shown) projectingly provided on a lower surface of a central part of the second slide block 33. Therefore, with the male screw rod 381 driven by the pulse motor 382 to rotate normally and reversely, the second slide block 33 is moved in the indexing feed direction (Y-axis direction) indicated by arrow Y along the guide rails 322, 322.

The laser beam machining apparatus in the embodiment shown in the figure is provided with Y-axis direction position detecting means 384 for detecting the position in the Y-axis direction of the second slide block 33. The Y-axis direction position detecting means 384 includes a linear scale 384a disposed along the guide rail 322, and a reading head 384b disposed on the second slide block 33 and moved along the linear scale 384a together with the second slide block 33. The reading head 384b of the Y-axis direction position detecting means 384, in the embodiment shown in the figure, sends a pulse signal containing one pulse per 1 µm to the control means which will be described later. The control means described later counts the pulses in the pulse signal inputted thereto, thereby detecting the position in the Y-axis direction of the chuck table 36.

The laser beam irradiation unit support mechanism 4 includes a pair of guide rails 41, 41 disposed on the stationary base 2 in parallel to each other along the indexing feed direction (Y-axis direction) indicated by arrow Y, and a movable support base 42 disposed on the guide rails 41, 41 so as to be movable in the direction indicated by arrow Y. The movable support base 42 includes a moving support part 421 movably disposed on the guide rails 41, 41, and a mount part 422 attached to the moving support part 421. The mount part 422 is provided on its side surface with a pair of guide rails 423, 423 extending in the direction indicated by arrow Z and being parallel to each other. The laser beam irradiation unit support mechanism 4 in the embodiment shown in the figure is provided with second indexing feeding means 43 for moving the movable support base 42 in the indexing feed direction (Y-axis direction) indicated by arrow Y along the pair of guide rails 41, 41.

The second indexing feeding means 43 includes a male screw rod 431 disposed in parallel to and between the pair of guide rails 41, 41, and a drive source such as a pulse motor 432 for driving the male screw rod 431 to rotate. Of the male screw rod 431, one end is rotatably supported on a bearing block (not shown) fixed to the stationary base 2, and the other end is power-transmittingly connected to an output shaft of the pulse motor 432. Incidentally, the male screw rod 431 is in screw engagement with a female screw hole formed in a female screw block (not shown) projectingly provided on a lower surface of a central part of the moving support part 421 constituting the movable support base 42. Therefore, with the male screw rod 431 driven by the pulse motor 432 to rotate normally and reversely, the movable support base 42 is moved in the indexing feed direction (Y-axis direction) indicated by arrow Y along the guide rails 41, 41.

The laser beam irradiation unit 5 includes a unit holder 51, and laser beam irradiation means 52 attached to the unit holder 51. The unit holder 51 is provided with a pair of guided grooves 511, 511 in which to slidably fit the pair of guide rails 423, 423 provided on the mount part 422, and is supported so as to be movable in the direction (Z-axis direction) indicated by arrow Z, with its guided grooves 511, 511 fitted over the guide rails 423, 423.

The laser beam irradiation unit 5 has light condensing point position adjusting means 53 for moving the unit holder 51 in a focal point adjusting direction (Z-axis direction) indicated by arrow Z along the pair of guide rails 423, 423. The light condensing point position adjusting means 53 includes a male screw rod (not shown) disposed between the pair of guide rails 423, 423, and a drive source such as a pulse motor 532 for driving the male screw rod to rotate. With the male screw rod (not shown) driven by the pulse motor 532 to rotate normally and reversely, the unit holder 51 and the laser beam irradiation means 52 are moved in the focal point position adjusting direction (Z-axis direction) indicated by arrow Z along the guide rails 423, 423. Incidentally, in the embodiment shown in the figure, with the pulse motor 532 driven to rotate normally, the laser beam irradiation means 52 is moved upwards, and, with the pulse motor 532 driven to rotate reversely, the laser beam irradiation means 52 is moved downwards.

The laser beam irradiation unit 5 has Z-axis direction position detecting means 55 for detecting the position in the Z-axis direction of the laser beam irradiation means 52. The Z-axis direction position detecting means 55 includes a linear scale 551 disposed in parallel to the guide rails 423, 423, and a reading head 552 attached to the unit holder 51 and moved along the linear scale 551 together with the unit holder 51. The reading head 552 in the Z-axis direction position detecting means 55, in the embodiment shown in the figure, sends a pulse signal containing one pulse per 1 µm to the control means which will be described later.

Figure 2:
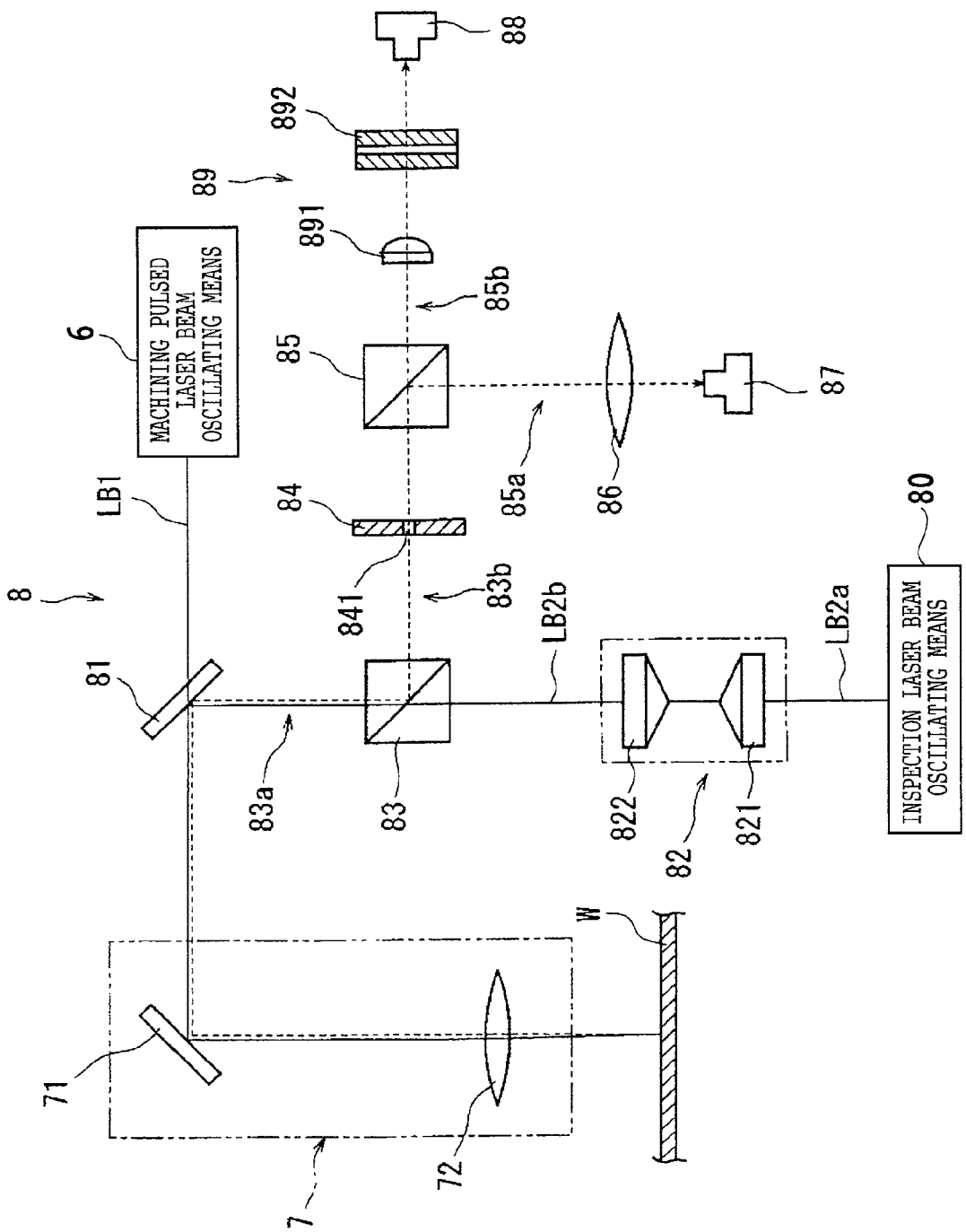
FIG. 2 is a block diagram showing the configuration of the position height detector for a work held on a chuck table that is configured according to the present invention.

The laser beam irradiation means 52 includes a hollow cylindrical casing 521 disposed substantially horizontally. As shown in FIG. 2, in the casing 521 there are provided machining pulsed laser beam oscillating means 6, and a light condenser 7 by which a work held on the chuck table 36 is irradiated with a machining pulsed laser beam oscillated by the machining pulsed laser beam oscillating means 6. The machining pulsed laser beam oscillating means 6 oscillates a machining pulsed laser beam LB1 having such a wavelength as to be transmissive to the wafer serving as a work. As the machining pulsed laser beam oscillating means 6, there can be used, for example, a YVO4 pulsed laser oscillator or YAG pulsed laser oscillator for oscillating a machining pulsed laser beam LB1 having a wavelength of 1064 nm. The light condenser 7 includes a deflecting mirror 71 by which the direction of the machining pulsed laser beam LB1 oscillated from the machining pulsed laser beam oscillating means 6 is deflected toward the lower side in FIG. 2, and a condenser lens 72 for condensing the machining pulsed laser beam LB1 deflected by the deflecting mirror 71.

Referring to FIG. 2 again, the laser beam machining apparatus in the embodiment shown in the figure has a height position detector 8 for detecting the height position of an upper surface of the work held on the chuck table. The height position detector 8 includes: inspection laser beam oscillating means 80 for oscillating an inspection laser beam; a dichroic half-mirror 81 which is disposed between the machining pulsed laser beam oscillating means 6 and the light condenser 7 and by which the inspection laser beam oscillated from the inspection laser beam oscillating means 80 is split toward the light condenser 7; annular spot forming means 82 which is disposed between the dichroic half-mirror 81 and the inspection laser beam oscillating means 80 and by which the spot shape (sectional shape) of the inspection laser beam oscillated by the inspection laser beam oscillating means 80 is formed into an annular shape; and a first beam splitter 83 which is disposed between the annular spot forming means 82 and the dichroic half-mirror 81 and by which the inspection laser beam with its spot shape (sectional shape) formed into the annular shape by the annular spot forming means 82 is guided into a first path 83a directed toward the dichroic half-mirror 81.

As the inspection laser beam oscillating means 80, there can be used, for example, a He—Ne pulsed laser oscillator for oscillating an inspection laser beam LB2a which has a frequency different from the frequency of the machining pulsed laser beam oscillated from the machining laser beam oscillating means 6, for example, which has a wavelength of 635 nm. The dichroic half-mirror 81 transmits the machining pulsed laser beam LB1 but reflects the inspection laser beam oscillated from the inspection laser beam oscillating means 80 towards the light condenser 7. The annular spot forming means 82, in the embodiment shown in the figure, includes a first conical lens 821 and a second conical lens 822 which are arranged in series with each other at a predetermined interval along the inspection laser beam LB2a. Incidentally, while the pair of the first conical lens 821 and the second conical lens 822 are arranged with their vertexes facing each other in the embodiment shown in the figure, they may be arranged with their back surfaces facing each other or may be arranged in the state of being oriented in the same direction.

The annular spot forming means 82 thus configured functions so that the inspection laser beam LB2a with the circular spot shape which is oscillated by the inspection laser beam oscillating means 80 is formed into a laser beam LB2b having an annular spot shape. Incidentally, the annular spot forming means 82 may be a mask member provided with an annular hole. The first beam splitter 83 functions so that the laser beam LB2b with its spot shape formed into an annular shape by the annular spot forming means 82 is guided into the first path 83a directed toward the dichroic half-mirror 81, and the reflected light (described later) split by the dichroic half-mirror 81 is guided into a second path 83b.

The height position detecting means 8 includes: a pinhole mask 84 including a pinhole 841 disposed in the second path 83b and operative to restrict the passage of the reflected light having a diameter greater than a predetermined diameter; a second beam splitter 85 by which the reflected light having passed through the pinhole mask 84 is split into a third path 85a and a fourth path 85b; a condenser lens 86 for condensing 100% of the reflected light split into the third path 85a by the second beam splitter 85; and a first light receiving element 87 for receiving the reflected light condensed by the condenser lens 86. The first light receiving element 87 sends a voltage signal corresponding to the quantity of received light to the control means which will be described later. Incidentally, the pinhole 841 formed in the pinhole mask 84 has a diameter set to 1 mm, for example.

In addition, the height position detecting means 8 includes a second light receiving element 88 for receiving the reflected light split into the fourth path 85b by the second beam splitter 85, and light reception region restricting means 89 for restricting the reception region for the reflected light received by the second light receiving element 88. The light reception region restricting means 89, in the embodiment shown in the figure, includes a cylindrical lens 891 for condensing into a one-dimensional form the reflected light split into the fourth path 85b by the second beam splitter 85, and a one-dimensional mask 892 by which the reflected light condensed into the one-dimensional form by the cylindrical lens 891 is restricted to unit length. The second light receiving element 88 for receiving the reflected light having passed through the one-dimensional mask 892 sends a voltage signal corresponding to the quantity of received light to the control means which will be described later.

Figure 3:
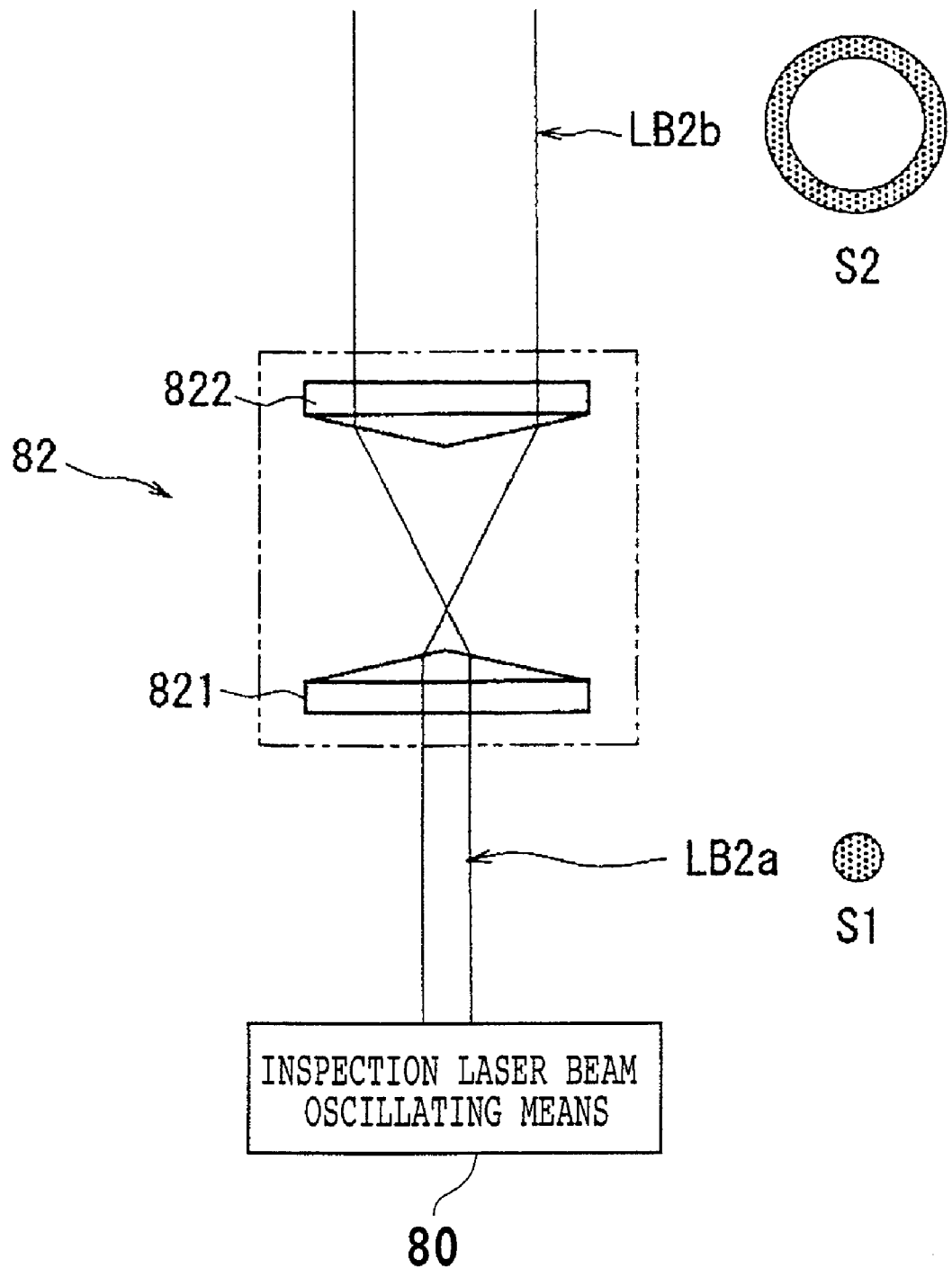
FIG. 3 illustrates the condition where a laser beam with a circular spot shape is formed into an annular spot shape by annular spot forming means constituting the height position detector shown in FIG. 2.

The height position detecting means 8 is thus configured, and its operation will be described below. As shown in FIG. 3, the inspection laser beam LB2a having a circular spot shape S1 which is oscillated from the inspection laser beam oscillating means 80 is formed into the inspection laser beam LB2b having an annular spot shape S2 by the annular spot forming means 82. Specifically, the annular spot forming means 82 functions so that the laser beam LB2a having a diameter of 2 mm is expanded into the annular laser beam LB2b having, for example, an outer diameter (D1) of 10 mm and an inner diameter (D2) of 8 mm and, simultaneously, is formed into a parallel beam. As shown in FIG. 2, the inspection laser beam LB2b formed into the annular spot shape S2 by the annular spot forming means 82 is guided into the first path 83a by the first beam splitter 83, reaches the dichroic half-mirror 81, and is reflected by the dichroic half-mirror 81 toward the light condenser 7. The inspection laser beam LB2b reflected toward the light condenser 7 is deflected by the deflecting mirror 71 toward the lower side in FIG. 2, like the machining pulsed laser beam LB1, and is condensed by the condenser leans 72.

Figure 4:
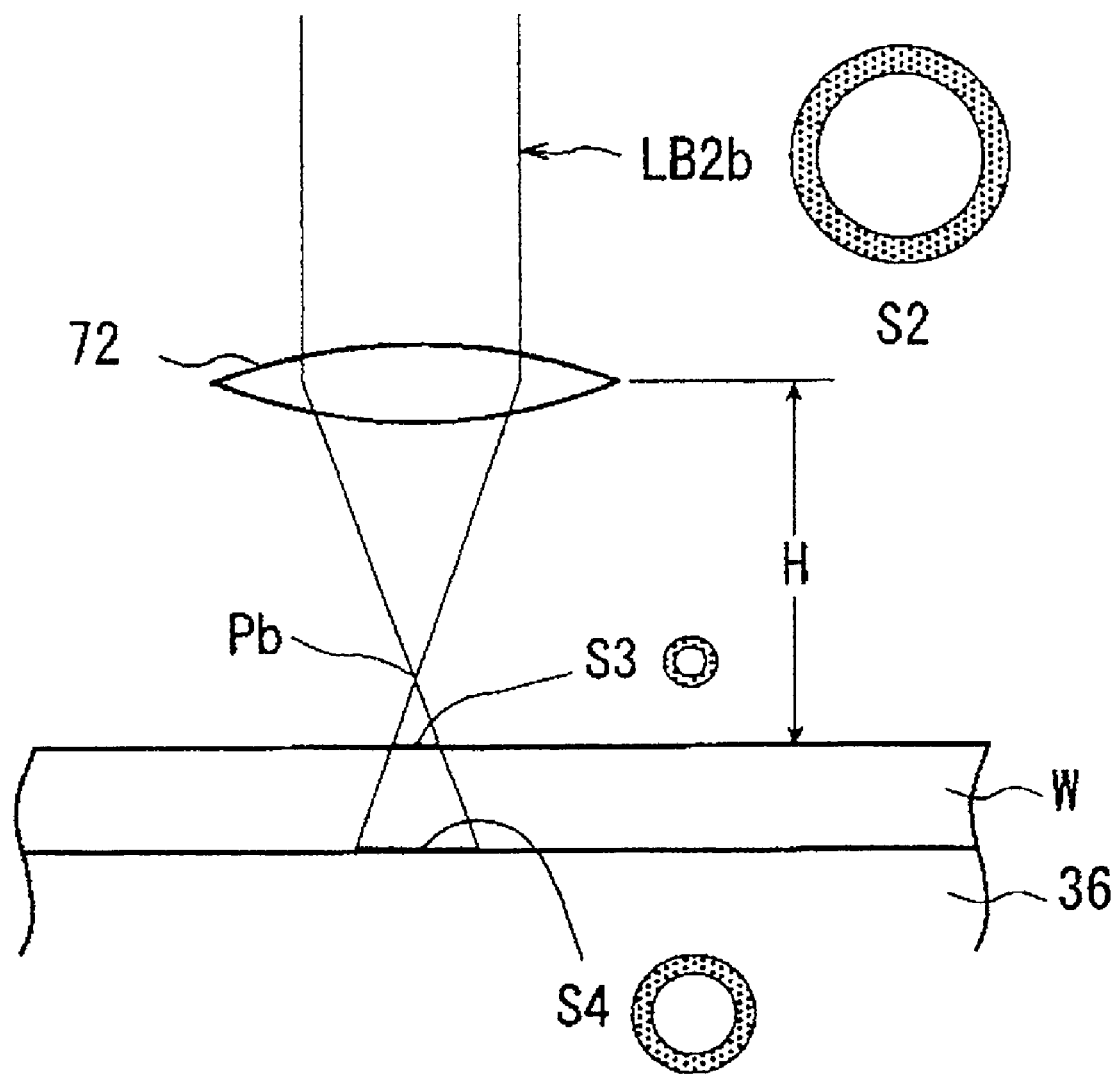
FIG. 4 illustrates the condition where a work held on the chuck table is irradiated with a laser beam by the height position detector shown in FIG. 2.

In the case of irradiating the upper surface of the work W held on the chuck table 36 with the inspection laser beam LB2b formed into the annular spot shape S2 as above-mentioned, the light condensing point position adjusting means 53 is so operated that the light condensing point Pb is located on the upstream side (upper side) in the laser beam irradiation direction relative to the upper surface of the work W, as shown in FIG. 4. As a result, the inspection laser beam LB2b formed into the annular spot shape S2 is radiated onto the upper surface of the work W held on the chuck table 36 in an annular spot shape S3, and is reflected in the size of the annular spot shape S3 (first reflected light). In this instance, in the case where the work W is formed from sapphire or quartz having a transparent property, the inspection laser beam LB2b is transmitted through the work W to reach the lower surface of the work W, and is reflected in the size of an annular spot shape S4 (second reflected light).

Figure 5:
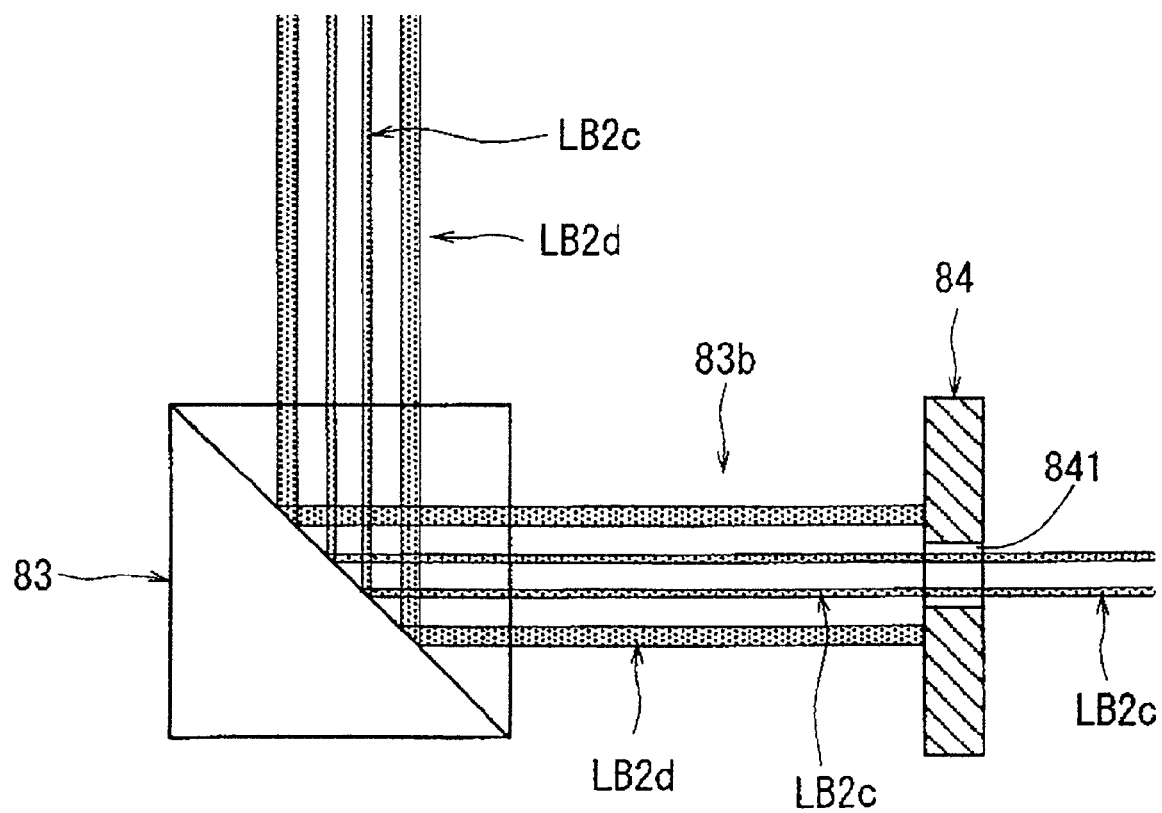
FIG. 5 illustrates the condition where a part of reflected light split by a first beam splitter constituting the height position detector shown in FIG. 2 is intercepted by a pinhole mask whereas another part passes through the pinhole mask.

The first reflected light having the annular spot shape S3 which is thus reflected by the upper surface of the work W and the second reflected light having the annular spot shape S4 which is thus reflected by the lower surface of the work W reach the first beam splitter 83 through the condenser lens 72, the deflecting mirror 71, and the dichroic half-mirror 81. As shown in FIG. 5, the first reflected light LB2*c* having the annular spot shape S3 and the second reflected light LB2*d* having the annular spot shape S4 which reach the first beam splitter 83 are split into the second path 83*b* by the first beam splitter 83, to reach the pinhole mask 84. The pinhole 841 formed in the pinhole mask 84, in the embodiment shown in the figure, has a diameter set to 1 mm, for example, so that the first reflected light LB2*c* having the annular spot shape S3 is permitted to pass through the pinhole 841, whereas the second reflected light LB2*d* having the annular spot shape S4 is intercepted by the pinhole mask 84.

Incidentally, the diameter of the pinhole 841 formed in the pinhole mask 84 is set by taking the thickness of the work W, the position of the light condensing point Pb and the like into account so that the first reflected light LB2*c* having the annular spot shape S3 is permitted to pass through the pinhole 841 whereas the second reflected light LB2*d* having the annular spot shape S4 is intercepted by the pinhole mask 84. Thus, the second reflected light LB2*d* having the annular spot shape S4 which has been reflected by the lower surface of the work W is intercepted by the pinhole mask 84, and only the first reflected light LB2*c* having the annular spot shape S3 which has been reflected by the upper surface of the work W is permitted to pass through the pinhole 841 in the pinhole mask 84.

The first reflected light LB2*c* with the annular spot shape S3 reflected by the upper surface of the work W and permitted to pass through the pinhole 841 of the pinhole mask 84 as above-mentioned is split by the second beam splitter 85 into the third path 85*a* and the fourth path 85*b*, as shown in FIG. 2. The first reflected light LB2*c* with the annular spot shape S3 split into the third path 85*a* is entirely (100%) condensed by the condenser lens 86 and received by the first light receiving element 87. Then, the first light receiving element 87 sends a voltage signal corresponding to the quantity of received light to the control means which will be described later. On the other hand, the second reflected light LB2*d* with the annular spot shape S4 dispersed into the fourth path 85*b* is condensed into a one-dimensional form by the cylindrical lens 891 of the light reception region restricting means 89, is restricted to a predetermined unit length by the one-dimensional mask 892, and is received by the second light receiving element 88. Then, the second light receiving element 88 sends a voltage signal corresponding to the quantity of received light to the control means which will be described later.

Here, the quantities of the first reflected light LB2*c* having the annular spot shape S3 received respectively by the first light receiving element 87 and the second light receiving element 88 will be described. The first reflected light LB2*c* having the annular spot shape S3 received by the first light receiving element 87 is constant in quantity because it is entirely (100%) received by the condenser lens 86, so that the voltage (V1) outputted from the first light receiving element 87 is constant (for example, 10 V). On the other hand, the first reflected light LB2*c* having the annular spot shape S3 received by the second light receiving element 88 is condensed into a one-dimensional form by the cylindrical lens 891 and restricted to a predetermined unit length by the one-dimensional mask 892, before being received by the second light receiving element 88. Therefore, the quantity of light received by the second light receiving element 88 varies depending on the distance from the condenser lens 72 of the light condenser 7 to the upper surface of the work W, namely, on the height position (thickness) of the work W, in the case where the upper surface of the work W is irradiated with the inspection laser beam LB2*b* as shown in FIG. 4. Accordingly, the voltage (V2) outputted from the second light receiving element 88 varies depending on the height position of the upper surface of the work W irradiated with the inspection laser beam LB2*b*.

Figure 6A:
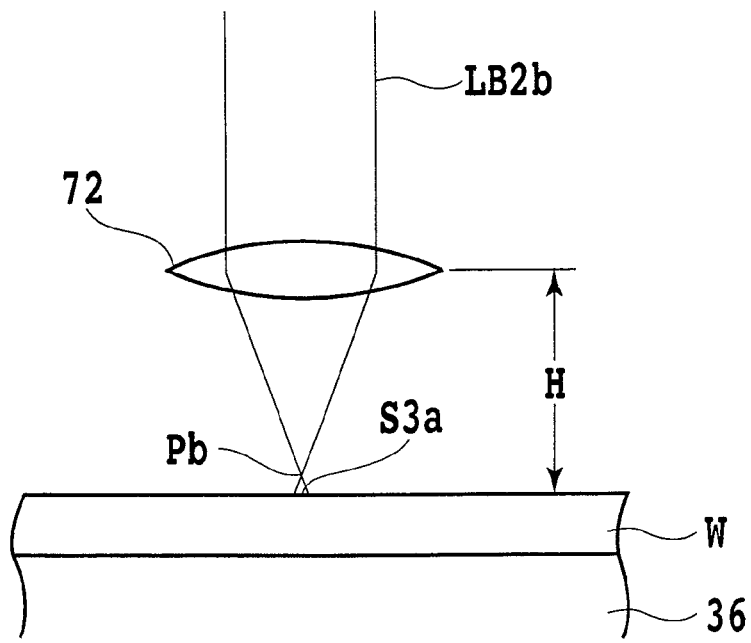
FIGS. 6A and 6B illustrate the condition where works having different thicknesses held on the chuck table are individually irradiated with a laser beam by the height position detector shown in FIG. 2.

For example, where the height position of the work W is higher (the thickness of the work W is greater) and the distance (H) from the condenser lens 72 to the upper surface of the work W is smaller as shown in FIG. 6A, the inspection laser beam LB2*b* is reflected in the shape of the annular spot S3*a* with which the upper surface of the work W is irradiated. The reflected light is split into the third path 85*a* and the fourth path 85*b* by the second beam splitter 85 as above-mentioned; in this case, the reflected light with the annular spot S3*a* split into the third path 85*a* is entirely (100%) condensed by the condenser lens 86, so that the whole quantity of the reflected light is received by the first light receiving element 87. On the other hand, the reflected light with the annular spot S3*a* split into the fourth path 85*b* by the second beam splitter 85 is condensed into a one-dimensional form by the cylindrical lens 891, so as to be substantially rectangular in section. The reflected light thus condensed into a substantially rectangular sectional shape is restricted to a predetermined unit length by the one-dimensional mask 892, so that a part of the reflected light split into the fourth path 85*b* is received by the second light receiving element 88. Therefore, the quantity of the reflected light received by the second light receiving element 88 is smaller than the quantity of light received by the first light receiving element 87.

Figure 6B:
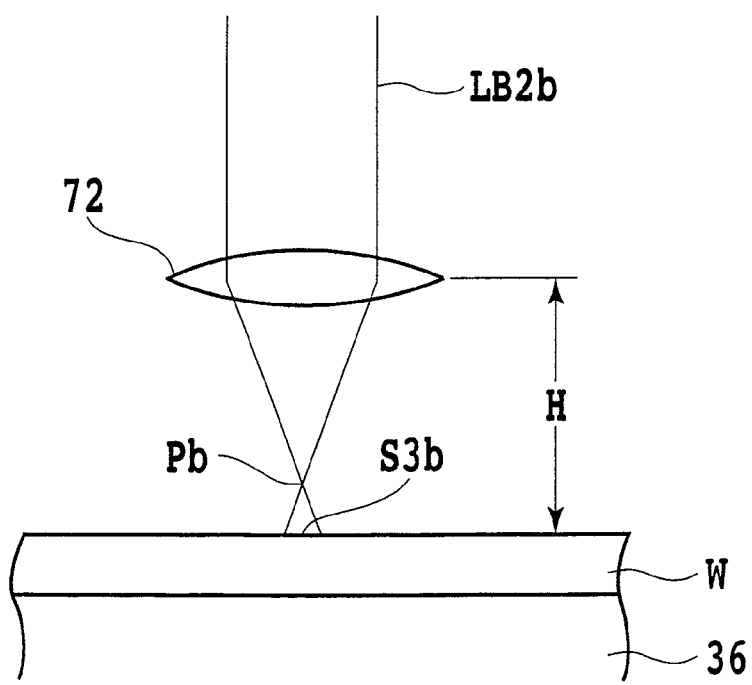

Next, where the height position of the work W is lower (the thickness of the work W is smaller) and the distance (H) from the condenser lens 72 to the upper surface of the work W is greater as shown in FIG. 6B, the inspection laser beam LB2*b* is reflected in the shape of the annular spot S3*b* with which the upper surface of the work W is irradiated. This annular spot S3*b* is greater than the above-mentioned annular spot S3*a*. The reflected light with the annular spot S3*b* is split into the third path 85*a* and the fourth path 85*b* by the second beam splitter 85 as above-mentioned; in this case, the reflected light in the annular area S3*b* split into the third path 85*a* is entirely (100%) condensed by the condenser lens 86, so that the whole quantity of the reflected light is received by the first light receiving element 87.

On the other hand, the reflected light with the annular spot S3*b* split into the fourth path 85*b* by the second beam splitter 85 is condensed into a one-dimensional form by the cylindrical lens 891, so as to be substantially rectangular in section. The length of the major edge of the substantially rectangular shape is greater than that in the case of the annular spot S3*a*, since the annular spot S3*b* of the reflected light is greater than the annular spot S3*a*. The reflected light thus condensed to be substantially rectangular in section is cut to a predetermined length by the one-dimensional mask 892, and a part of the condensed reflected light is received by the second light receiving element 88. Therefore, the quantity of light received by the second light receiving element 88 is smaller than that in the case shown in FIG. 6A. Thus, the quantity of the reflected light received by the second light receiving element 88 is greater as the distance (H) from the condenser lens 72 to the upper surface of the work W is smaller, namely, as the height position of the work W is higher (the thickness of the work W is larger), and the quantity of the reflected light received by the second light receiving element 88 is smaller as the distance (H) from the condenser lens 72 to the upper surface of the work W is larger, namely, as the height position of the upper surface of the work W is lower (the thickness of the work W is smaller).

Here, the relation between the ratio of the voltage (V1) outputted from the first light receiving element 87 to the voltage (V2) outputted from the second light receiving element 88 and the distance (H) from the condenser lens 72 to the upper surface of the work W, namely, the height position of the work W, will be described referring to the control map shown in FIG. 7. Incidentally, the axis of abscissas in FIG. 7 represents the distance (H) from the condenser lens 72 to the upper surface of the work W, and the axis of ordinates represents the ratio (V1/V2) of the voltage (V1) outputted from the first light receiving element 87 to the voltage (V2) outputted from the second light receiving element 88. In the example shown in FIG. 7, such a setting is made that the voltage ratio (V1/V2) is "1" where the distance (H) from the condenser lens 72 to the upper surface of the work W is 30.0 mm and that the voltage ratio (V1/V2) is "10" where the distance (H) from the condenser lens 72 to the upper surface of the work W is 30.6 mm. Therefore, the distance (H) from the condenser lens 72 to the upper surface of the work W can be determined by determining the ratio (V1/V2) of the voltage (V1) outputted from the first light receiving element 87 to the voltage (V2) outputted from the second light receiving element 88, and collating the voltage ratio (V1/V2) with the control map shown in FIG. 7. Incidentally, the control map shown in FIG. 7 is stored in a memory of the control means which will be described later.

In use of the height position detecting means 8 configured as above, the inspection laser beam LB2a having the circular spot shape S1 which is oscillated from the inspection laser beam oscillating means 80 is formed into the inspection laser beam LB2b having the annular spot shape S2 by the annular spot forming means 82, and the work W is irradiated with the inspection laser beam LB2b having the annular spot shape S2. Therefore, as shown in FIG. 4, the inspection laser beam LB2b having the annular spot shape S2 with which the work W is irradiated is reflected in the annular spot shape S3 by the upper surface of the work W; in addition, where the work W has a transparent property, the inspection laser beam LB2b is reflected in the annular spot shape S4 by the lower surface of the work W. The second reflected light LB2b having the annular spot shape S4 reflected by the lower surface of the work W is intercepted by the pinhole mask 84, and the quantity of light received is detected based on the first reflected light LB2c of the annular spot shape S3 which has been reflected by the upper surface of the work W and has passed through the pinhole 841 in the pinhole mask 84. Therefore, the height position of the upper surface of the work W can be accurately detected even where the work W has a transparent property.

Referring to FIG. 1 again, at a tip part of the casing 521 constituting the laser beam irradiation means 52, image pickup means 9 is disposed for detecting a machining region to be subjected to laser beam machining by use of the laser beam irradiation means 52. The image pickup means 9 includes not only an ordinary image pickup device (CCD) for picking up an image by use of a visible beam but also IR illuminating means for illuminating the work with infrared rays, an optical system for catching the infrared rays radiated from the IR illuminating means, an image pickup device (IR CCD) for outputting an electrical signal corresponding to the infrared rays caught by the optical system, and sends an image signal corresponding to the image thus picked up to the control means which will be described later.

Figure 8:
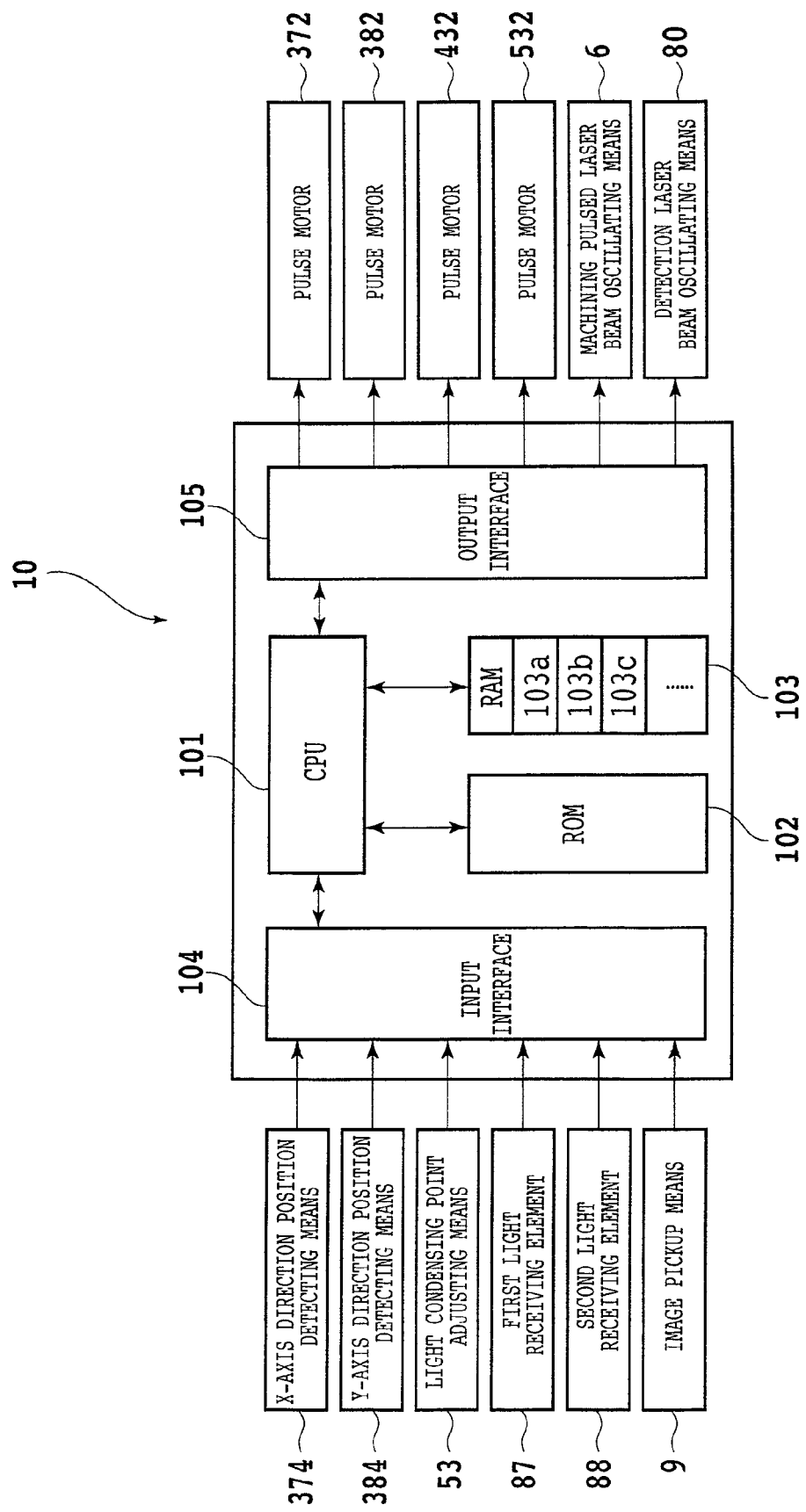
FIG. 8 is a block diagram showing control means constituting the height position detector shown in FIG. 2.

The laser beam machining apparatus in the embodiment shown in the figures has the control means 10 shown in FIG. 8. The control means 10 is comprised of a computer, including a central processor unit (CPU) 101 for performing arithmetic processes according to a control program, a read only memory (ROM) 102 for storing the control program or the like, a readable and writable random access memory (RAM) 103 for storing the results of arithmetic processes or the like, an input interface 104 and an output interface 105. The input interface 104 of the control means 10 is supplied with detection signals from the X-axis direction position detecting means 374, the Y-axis direction position detecting means 384, the light condensing point position adjusting means 53, the first light receiving element 87, the second light receiving element 88, the image pickup means 9, etc. Besides, control signals are outputted from the output interface 105 of the control means 10 to the pulse motor 372, the pulse motor 382, the pulse motor 432, the pulse motor 532, the machining pulsed laser beam oscillating means 6, the inspection laser beam oscillating means 80, etc. Incidentally, the random access memory (RAM) 103 includes a first storage region 103a for storing the control map shown in FIG. 7, a second storage region 103b for storing design data for the work which will be described later, a third storage region 103c for storing the height positions for the optical device wafer 10 which will be described later, and other storage regions.

Figure 9:
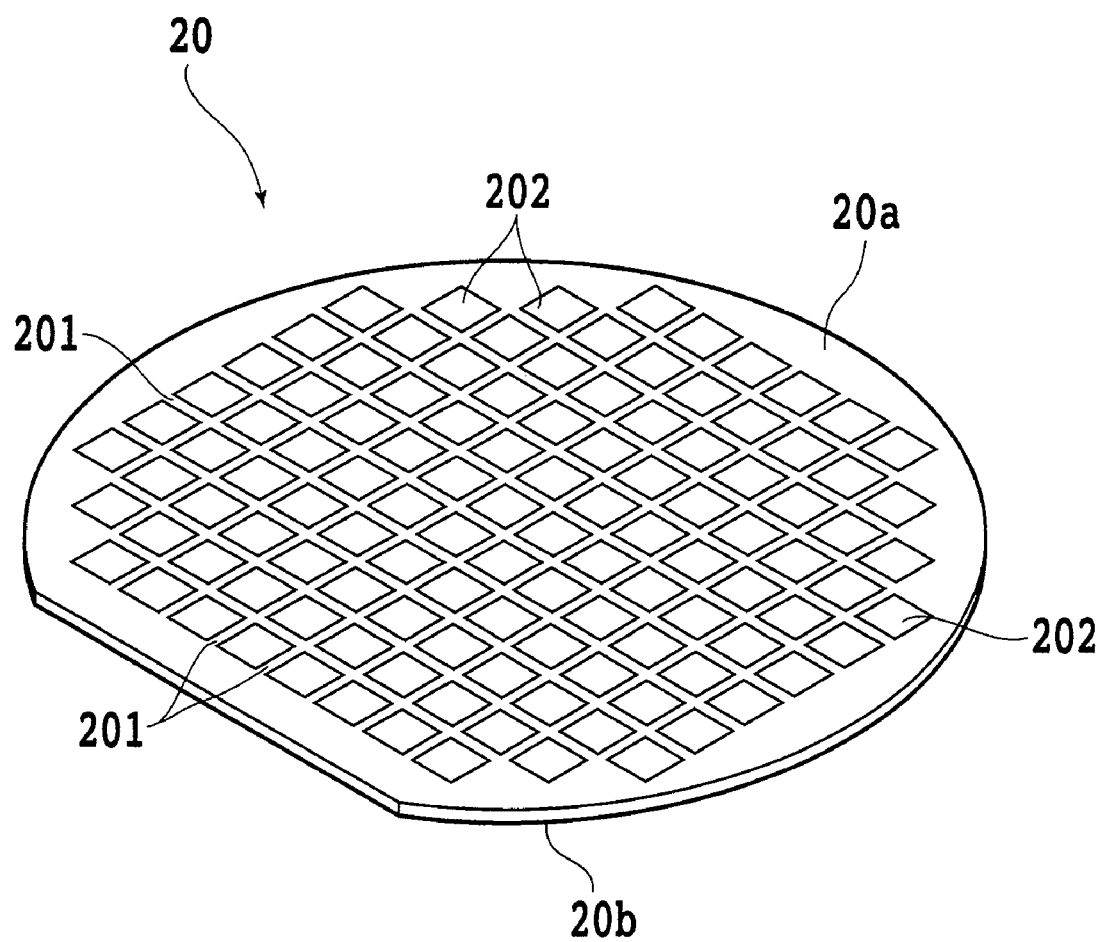
FIG. 9 is a perspective view of a semiconductor wafer as a work.

The laser beam machining apparatus in the embodiment shown in the figures is configured as above, and its operation will be described below. FIG. 9 shows a perspective view of an optical device wafer 20 as the work to be subjected to laser beam machining. The optical device wafer 20 shown in FIG. 9 has a sapphire wafer, wherein a plurality of regions are demarcated by a plurality of streets (planned dividing lines) 201 arranged in a grid pattern in a face-side surface 20a, and optical devices 202 such as light emitting diodes, laser diodes or the like are formed in the thus demarcated regions.

Now, description will be made of a laser machining process in which the optical device wafer 20 is irradiated with a laser beam along the planned dividing lines 201 by use of the above-described laser beam machining apparatus, whereby a denatured layer is formed in the inside of the optical device wafer 20 along the streets 201. Incidentally, in forming the denatured layer in the inside of the optical device wafer 20, if a dispersion is present in the thickness of the optical device wafer 20, it would be impossible to form the denatured layer uniformly at a predetermined depth, due to a problem associated with the refractive index of the wafer, as above-mentioned. In view of this, prior to the laser beam machining, the height position of the optical device wafer 20 held on the chuck table 36 is measured by use of the above-described height position detector 8. Specifically, first, the optical device wafer 20 is placed, with its back-side surface 20b up, on the chuck table 36 of the laser beam machining apparatus shown in FIG. 1, and the optical device wafer 20 is suction held on the chuck table 36. The chuck table 36 with the optical device wafer 20 suction held thereon is positioned into a position just under the image pickup means 9 by the machining feeding means 37.

After the chuck table 36 is positioned in the position just under the image pickup means 9, an alignment operation for detecting a machining region, to be subjected to laser beam machining, of the optical device wafer 20 is performed by use of the image pickup means 9 and the control means 10. Specifically, the image pickup means 9 and the control means 10 carry out alignment by performing image processing such as pattern matching for position matching between the street 201 formed in the optical device wafer 20 in a predetermined direction and the light condenser 7 of the height position detector 8 for detecting the height of the optical device wafer 20 along the street 201. In addition, alignment is similarly carried out also with regard to the street 201 formed in the optical device wafer 20 in a direction orthogonal to the predetermined direction. In this case, the face-side surface 20*a* provided with the streets 201 of the optical device wafer 20 is located on the lower side. However, since the image pickup means 9 has image pickup means comprised of the IR illuminating means, the optical system for catching the infrared rays, the image pickup device (IR CCD) for outputting an electrical signal corresponding to the infrared rays thus caught, etc., the image of the streets 201 can be picked up in a see-through manner from the side of the back-side surface 20*b*.

Figure 10A:
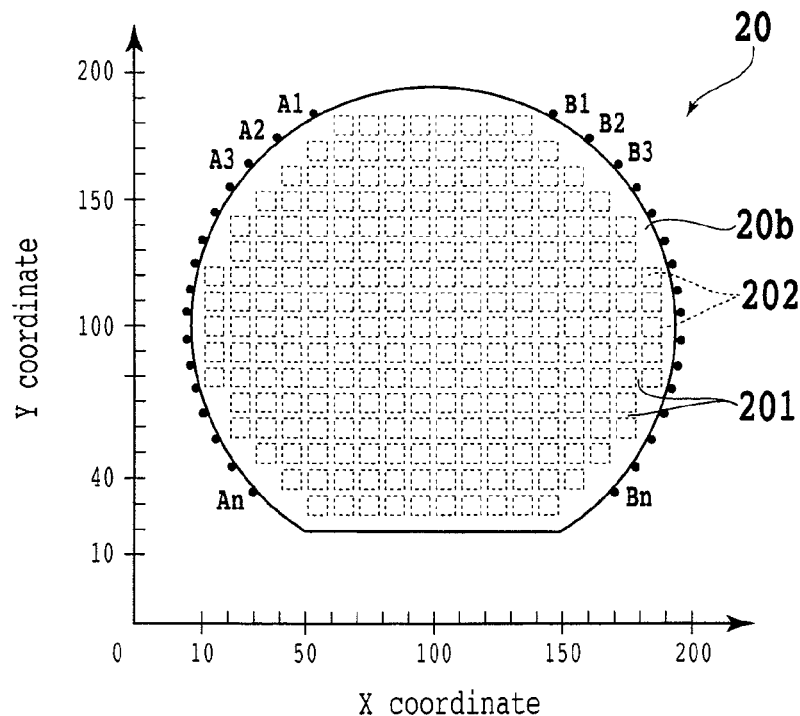
FIGS. 10A and 10B illustrate relations of the semiconductor wafer shown in FIG. 9 in the state of being held in a predetermined position on the chuck table of the laser beam machining apparatus shown in FIG. 1, with coordinate positions.
Figure 10B:
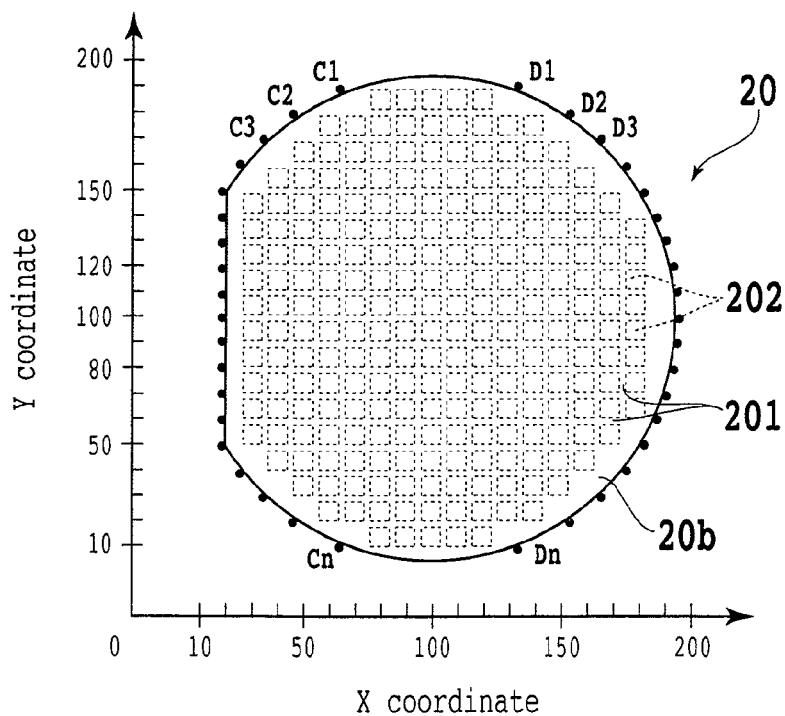

After the alignment is carried out as above, the optical device wafer 20 on the chuck table 36 is in the state of positioned in the coordinate position shown in FIG. 10A. Incidentally, FIG. 10B shows the condition obtained upon rotating the chuck table 36, namely, the optical device wafer 20 by 90 degrees from the condition shown in FIG. 10A.

Incidentally, feed start position coordinate values (A1, A2, A3 . . . An) and feed finish position coordinate values (B1, B2, B3 . . . Bn) and feed start position coordinate values (C1, C2, C3 . . . Cn) and feed finish position coordinate values (D1, D2, D3 . . . Dn) of the streets 201 formed in the optical device wafer 20 in the state of being positioned in the coordinate positions shown in FIGS. 10A and 10B are stored in the second storage region 103*b* in the random access memory (RAM) 103.

Figure 11:
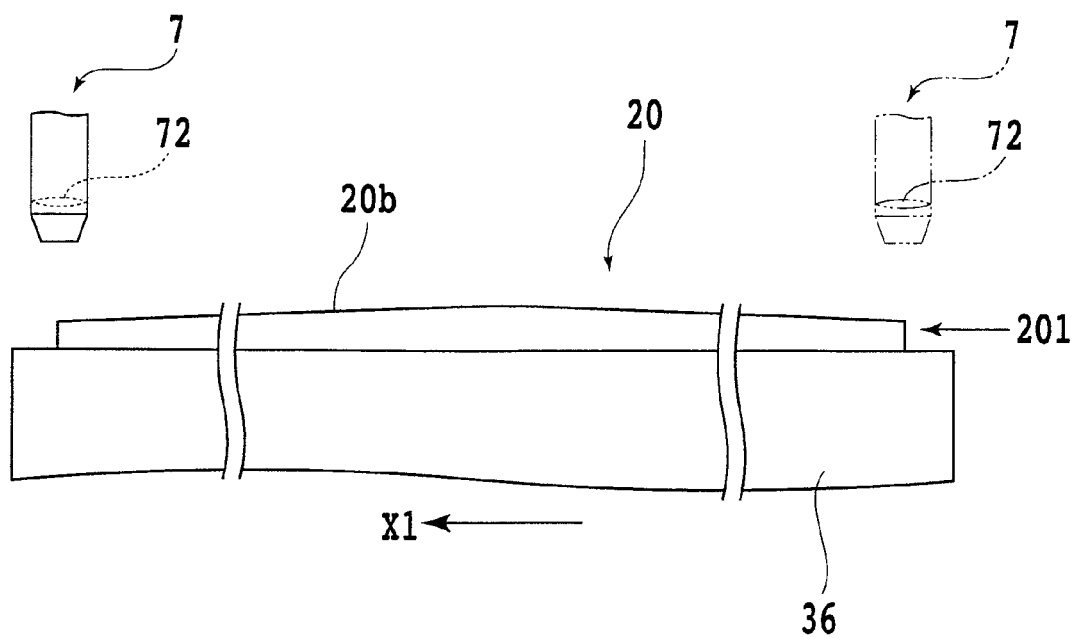
FIG. 11 illustrates a height position detecting step carried out by the height position detector provided in the laser beam machining apparatus shown in FIG. 1.

After the streets 201 formed in the optical device wafer 20 held on the chuck table 36 are detected and alignment for the height detection position is carried out as above-mentioned, the chuck table 36 is moved so that the street 201 at the uppermost position in FIG. 10A is positioned into a position just under the light condenser 7. Then, as shown in FIG. 11 further, the feed start position coordinate value (A1) (see FIG. 10A) which is one end (the left end in FIG. 11) of the street 201 is positioned into the position just under the light condenser 7. Subsequently, the height position detecting means 8 is operated, and the chuck table 36 is moved in the direction indicated by arrow X1 in FIG. 11 to the feed finish position coordinate value (B1) (height position detecting step). As a result, the height position (the distance (H) from the condenser lens 72 to the upper surface of the work W) at the street 201 at the uppermost position in FIG. 10A of the optical device wafer 20 can be detected as above-mentioned. The thus detected height position (the distance (H) from the condenser lens 72 to the upper surface of the work W) is stored into the third storage region 103*c* in the random access memory (RAM) 103, in correspondence with the coordinate values stored in the second storage region 103*b*. The height position detecting step is carried out in this manner along all the streets 201 formed in the optical device wafer 20, and the height positions at the streets 201 are stored into the third storage region 103*c* in the random access memory (RAM) 103.

Figure 12A:
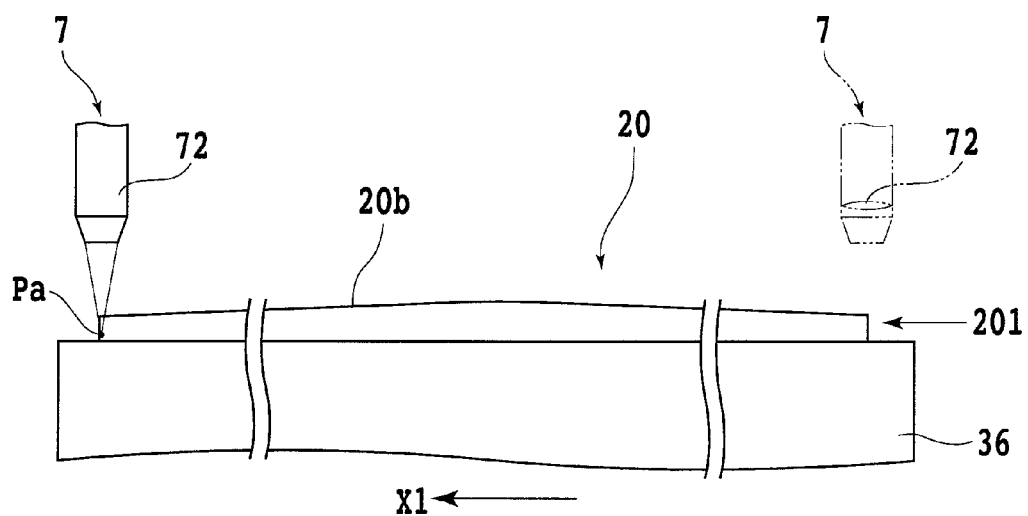
FIGS. 12A and 12B illustrate a machining step in which a denatured layer is formed in the semiconductor wafer shown in FIG. 9 by the laser beam machining apparatus shown in FIG. 1.

After the height position detecting step is conducted along all the streets 201 formed in the optical device wafer 20 in this manner, laser machining for forming a denatured layer in the inside of the optical device wafer 20 along the streets 201 is performed. In carrying out the laser beam machining, first, the chuck table 36 is moved so that the street 201 at the uppermost position in FIG. 10A is positioned into a position just under the light condenser 7. Then, as shown in FIG. 12A further, the feed start position coordinate value (A1) (see FIG. 10A) which is one end (the left end in FIG. 12A) of the street 201 is positioned into the position just under the light condenser 7. The control means 10 operates the light condensing point position adjusting means 53 so that the light condensing point Pa of the machining pulsed laser beam LB1 radiated through the light condenser 7 is adjusted to a position of a predetermined depth from the back-side surface 20*b* (upper surface) of the optical device wafer 20. Next, the control means 10 operates the machining pulsed laser beam oscillating means 6 so that the chuck table 36 is moved in the direction indicated by arrow X1 at a predetermined machining feed rate while conducting irradiation with the machining pulsed laser beam LB1 through the light condenser 7 (machining step).

Figure 12B:
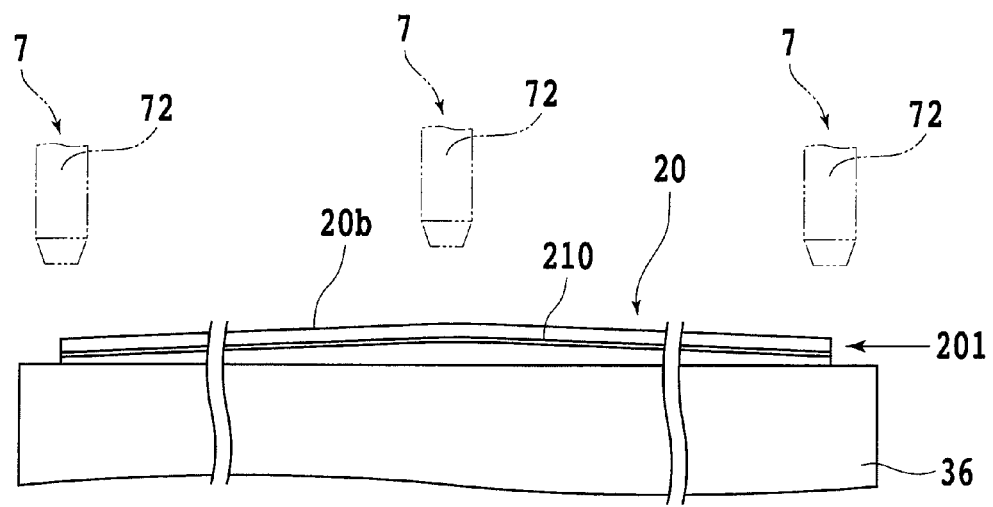

Thereafter, when the irradiation position of the light condenser 7 has reached the other end (the right end in FIG. 12B) of the street 201, irradiation with the pulsed laser beam is stopped, and movement of the chuck table 36 is stopped. In this machining step, the control means 10 controls the pulse motor 532 of the light condensing point position adjusting means 53, based on the height position corresponding to the X-coordinate value at the street 201 of the optical device wafer 20 stored in the third storage region 103*c* in the random access memory (RAM) 103, whereby the light condenser 7 is moved in the vertical direction in correspondence with the height position at the street 201 of the optical device wafer 20, as shown in FIG. 12B. As a result, in the inside of the optical device wafer 20, the denatured layer 210 is formed at the position of a predetermined depth from the back-side surface 20*b* (upper surface) and in parallel to the back-side surface 20*b* (upper surface), as shown in FIG. 12B.

Incidentally, the machining conditions in the above-mentioned machining step are set, for example, as follows.

Figure 13:
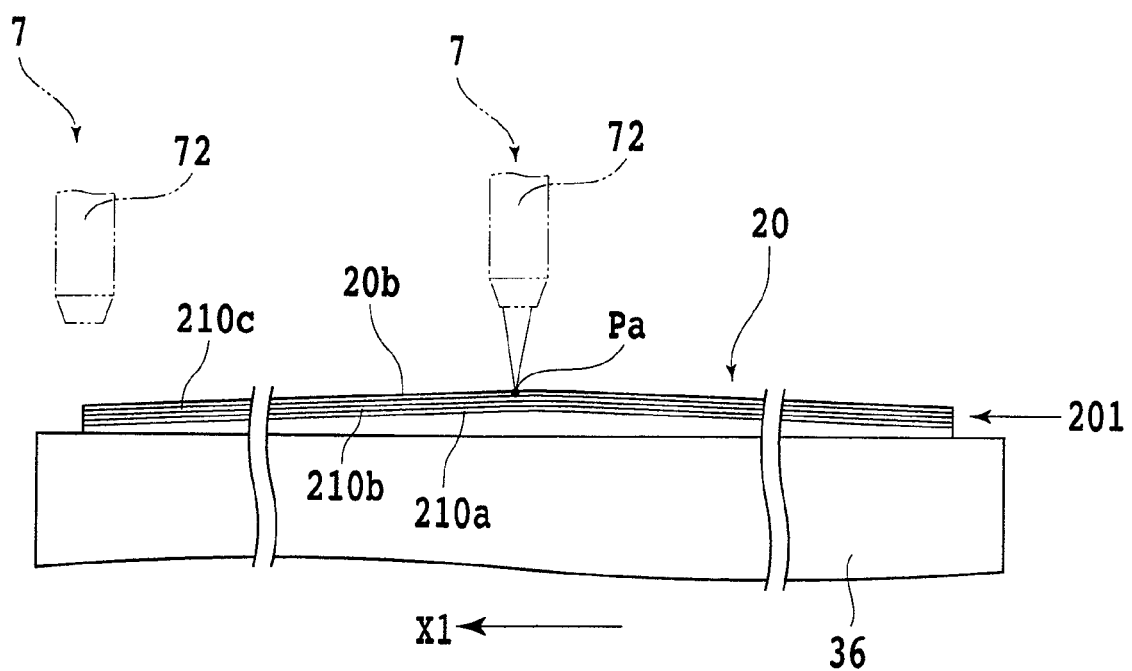
FIG. 13 illustrates a machining step in the case where the work is large in thickness.

Laser: YVO4 pulsed laser
Wavelength: 1064 nm
Repetition frequency: 100 kHz
Pulse output: 2.5 μJ
Condensed spot diameter: ϕ1 μm
Machining feed rate: 100 mm/sec Incidentally, in the case where the optical device wafer 20 has a large thickness, a plurality of denatured layers 210*a*, 210*b*, 210*c* are desirably formed, as shown in FIG. 13, by repeating the above-mentioned machining step while changing stepwise the light condensing point Pa. The formation of the denatured layers 210*a*, 210*b*, 210*c* is preferably carried out by displacing the light condensing point of the laser beam stepwise in the order of 210*a*, 210*b*, and 210*c*.

After the above-mentioned machining step is performed along all the streets 201 extending in the predetermined direction of the optical device wafer 20 in the above-mentioned manner, the chuck table 36 is turned by 90 degrees, and the machining step is carried out along each of the streets extending in the direction orthogonal to the predetermined direction. After the machining step is thus conducted along all the streets 201 formed in the optical device wafer 20, the chuck table 36 with the optical device wafer 20 held thereon is returned to the position at which the optical device wafer 20 has first been suction held, where the suction holding of the optical device wafer 20 is canceled. Then, the optical device wafer 20 is fed to a dividing step by feeding means (not shown).

While an example in which the height position detector for a work held on a chuck table based on the present invention is applied to a laser beam machining apparatus has been shown above, the invention is applicable to various machining apparatuses for machining a work held on a chuck table.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A height position detector for a work held on a chuck table, for detecting the height position of an upper surface of a work held on a chuck table, comprising:

laser beam oscillating means for oscillating a laser beam;

annular spot forming means by which a spot of said laser beam oscillated by said laser beam oscillating means is formed into an annular shape;

a first beam splitter by which said laser beam with the spot formed into said annular shape by said annular spot forming means is guided into a first path;

a light condenser by which said laser beam guided into said first path is condensed so as to irradiate said work held on said chuck table therewith;

a pinhole mask disposed in a second path into which said laser beam reflected by said work held on said chuck table is split by said first beam splitter;

a second beam splitter by which said reflected light having passed through said pinhole mask is split into a third path and a fourth path;

a first light receiving element for receiving said reflected light split into said third path by said second beam splitter;

a second light receiving element for receiving said reflected light split into said fourth path by said second beam splitter;

light reception region restricting means which is disposed in said fourth path and which restricts a reflected light reception region where said reflected light is received by said second light receiving element; and control means by which the height position of said upper surface of said work held on said chuck table is determined based on the ratio between the quantity of light received by said first light receiving element and the quantity of light received by said second light receiving element.

2. A height position detector for a work held on a chuck table as set forth in claim 1, wherein said annular spot forming means includes a pair of conical lenses arranged in series at a predetermined interval along said laser beam.

* * * * *